UNITED STATES PATENT OFFICE.

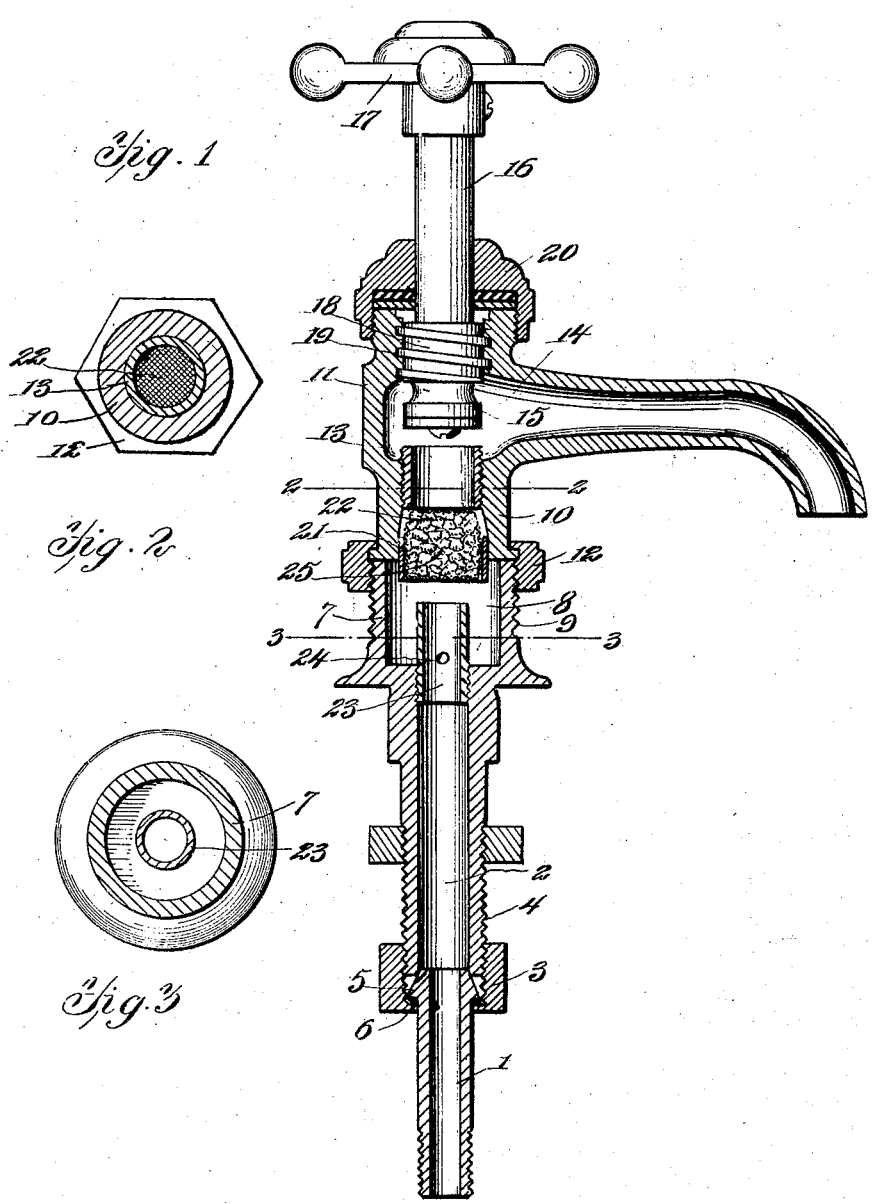

EDWARD A. GEHRKE, OF LINCOLN, NEBRASKA.

BASIN-COCK.

1,105,072.

Specification of Letters Patent.

Patented July 28, 1914.

Application filed July 23, 1913. Serial No. 780,810.

*To all whom it may concern:*

Be it known that I, EDWARD A. GEHRKE, a citizen of the United States, residing at Lincoln, in the county of Lancaster and State of Nebraska, have invented certain new and useful Improvements in Basin-Cocks, of which the following is a specification.

This invention relates to an improved faucet, wherein means is provided for filtering or straining the water before the same reaches the faucet valve, thus preventing the passage of solid impurities into the valve chamber.

A further object of the invention contemplates the provision of a removable filtering device, employed in connection with a faucet, the said device being arranged within the interior of the faucet body in such a manner as to create a catch basin adapted to accumulate and distrain all impurities of a solid nature until subsequently removed.

A still further object of the invention resides in the provision of a specially designed faucet, wherein the several embodiments or parts may be quickly and readily detached or disconnected to permit thorough cleaning or repair of the faucet interior should occasion demand.

The above and additional objects are accomplished by such means as are illustrated in their preferred embodiment in the accompanying drawings, described in the following specification, and then more particularly pointed out in the claims which are appended hereto, and form a part of this application.

In describing my invention in detail reference will be had to the accompanying drawings, wherein like characters denote like or corresponding parts throughout the several views, and in which:—

Figure 1 is a vertical sectional view of a faucet constructed in accordance with my invention; Fig. 2 is a section on the line 2—2 of Fig. 1; Fig. 3 is a section on the line 3—3 of Fig. 1.

Before proceeding with the description of the drawings, I desire to call attention to the fact that while I have evolved my invention with particular reference to the filtration of water, the same may be readily utilized in connection with any other liquids susceptible of its application.

Referring now to the drawings, wherein is illustrated the preferred form of my invention, the numeral 1 designates a supply pipe to which the inlet pipe 2 of the faucet is connected through the medium of a packing nut 3, the lower extremity of the said inlet pipe being exteriorly threaded, as at 4. A tapering head 5 is formed integrally with and upon the extremity of the supply pipe 1 for effecting a water-tight connection between the said supply pipe and the inlet pipe, the creation of the head providing a shoulder beneath which a rubber gasket 6 is fitted, which, in connection with the packing nut 3, produces the desired water tight connection between the said pipes 1 and 2.

The upper extremity of the inlet pipe 2 is enlarged as at 7 for the purpose of providing a chamber or catch basin 8, the purpose of which will subsequently appear. The said enlargement 7 is exteriorly threaded as at 9 to effect a water tight connection between the said enlargement and an extension 10 of the faucet body 11, the said extension having an annular flange formed upon the base thereof, over which a packing nut 12 is arranged, the said nut being secured to the enlargement 7 of the inlet pipe by means of the threads 9 formed thereupon.

A removable pipe section 13 is threaded within the interior of the faucet body 11, a portion of the said section extending or projecting into the interior of the outlet chamber 14 of the faucet, such projection forming a valve seat upon which the valve head 15 of the faucet normally rests. By threading the pipe section within the body, vertical adjustment of the said section is permitted, which adjustment, as is apparent upon reference to the drawings, will provide for variation in the space between the valve member and its seat to thereby increase or diminish the amount of water flowing out of the outlet 14 of the faucet, the latter, of course, being turned on. A stem 16 is secured to or formed integrally with the said head 15 of the valve, the former extending to the exterior of the faucet body and being provided with a knob or handle 17 of the ordinary type. A threaded enlargement 18 of the stem is formed near the base thereof, the said enlargement fitting within the interior of the threaded portion 19 of the valve body or casing by means of which the head 15 of the valve is moved into and out of engagement with the pipe section 13 forming a valve seat of the faucet. A cap 20 of the ordinary construction is arranged upon the top of the valve casing through which the valve stem 16 extends, the said cap being so constructed as to effect a water tight connection between the said cap and the said casing.

Disposed within the extension 10 of the casing and permanently secured upon the interior thereof I provide a metallic band 21, the said band projecting into the interior of the chamber or catch basin 8 of the inlet pipe enlargement. Arranged upon the interior of the band and extending upwardly and into the interior of the portion 10 of the casing I provide a filtering screen 22, substantially cylindrical in shape, both ends being closed by the screen material. The said screen is supported within the band by reason of its tight engagement, or if desired the screen may be provided with a ring by means of which it is soldered or otherwise permanently secured in proper place. A pipe section 23 is threaded into the upper extremity of the inlet pipe 2, the said pipe section extending upwardly and into the interior of the catch basin 8 to a point near the bottom of the filter, this arrangement leaving a space between the upper extremity of the said pipe section and the lower portion of the screen by means of which the dirt or sediment of the water is allowed to pass outwardly or away from the screen and later fall into the catch basin provided therefor. An opening 24 is formed within the section 23 near the base thereof, the said opening permitting the water contained within the catch basin to be withdrawn therefrom should the water supply be for any reason turned off, thereby facilitating to a great extent, the cleaning of the catch basin when desired. The said opening also allows the water to drain or flow from the catch basin and thus prevent freezing of the water contained therein during cold weather.

Having described fully the construction and disposition of the several embodiments of this invention, the operation of the same will now be set forth.

The water upon entering the section 23 from the inlet pipe 2 comes directly in contact with the lower portion of the filtering screen 22 through which it must pass before entering the pipe section 13 in the valve casing. By filling the screen 22 with any suitable filtering substance such as charcoal or the like, all solid impurities are distrained or prevented from passing into the pipe section 13 and outlet chamber 14 of the faucet. The section 23 being disposed away from the screen 22, sufficient space is provided to permit the impurities to fall into the catch basin 8 provided therefor, the said impurities being accumulated within the said basin until subsequently removed by cutting off the water supply and removing the casing body, by means of the connection illustrated by the numeral 12.

It will be seen from the above, taken in connection with the accompanying drawings, that all impurities or solid substances are distrained by the filtering screen 22 before reaching the valve mechanism above described, thereby insuring an effective operation of the said valve at all times.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, I declare that what I claim is:—

1. In a faucet, a casing having an outlet therein, an inlet pipe, an enlargement at one end of said pipe, said enlargement defining a catch basin, means detachably connecting said enlargement with said casing, an adjustable pipe section carried by said inlet pipe and extending into said basin, and a screen member supported within said casing and in spaced relation to said pipe section beneath the faucet outlet, as and for the purpose set forth.

2. In combination with a faucet having an adjustable valve member, an inlet pipe detachably secured to the said faucet, an enlargement formed upon said inlet pipe, the wall of the said enlargement defining a catch basin, a pipe section mounted upon the upper extremity of said inlet pipe, said pipe section extending into said basin, a filter screen arranged within said faucet over said pipe section and in spaced relation thereto, said screen being closed at each end, and an adjustable pipe section mounted within said faucet adjacent and above said screen and upon which the said valve is normally seated to close communication between the inlet and outlet of the faucet.

In testimony whereof I affix my signature in presence of two witnesses.

EDWARD A. GEHRKE.

Witnesses:
OLLIE REITTER,
R. A. HARVEY.

Copies of this patent may be obtained for five cents each, by addressing the "Commissioner of Patents, Washington, D. C."